United States Patent
Tanaka et al.

(10) Patent No.: US 7,288,865 B2
(45) Date of Patent: Oct. 30, 2007

(54) BICYCLE GENERATOR HUB

(75) Inventors: Kazuki Tanaka, Sakai (JP); Takahiro Endo, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/114,066

(22) Filed: Apr. 26, 2005

(65) Prior Publication Data

US 2006/0043807 A1 Mar. 2, 2006

(30) Foreign Application Priority Data

Aug. 31, 2004 (JP) ............................. 2004-252423

(51) Int. Cl.
 *B62J 6/12* (2006.01)
 *H02K 21/22* (2006.01)
 *B60B 27/00* (2006.01)
(52) U.S. Cl. ............. 310/67 A; 310/75 C; 310/156.66; 310/156.71; 310/190
(58) Field of Classification Search ............. 310/75 C, 310/156.66, 156.69, 156.71, 156.73, 156.54, 310/156.67, 190, 257, 256, 67 A
See application file for complete search history.

(56) References Cited

U.S. PATENT DOCUMENTS

| | | | | |
|---|---|---|---|---|
| 2,196,682 A | * | 4/1940 | Nowosielski | 310/156.73 |
| 2,516,380 A | * | 7/1950 | Goldschmidt | 310/155 |
| 4,191,988 A | | 3/1980 | Kumakura | |
| 4,227,105 A | | 10/1980 | Kumakura | |
| 4,499,391 A | * | 2/1985 | Sakamoto | 310/89 |
| 5,115,159 A | * | 5/1992 | Takamiya et al. | 310/67 A |
| 5,828,145 A | * | 10/1998 | Nakamura | 310/67 A |
| 6,118,196 A | * | 9/2000 | Cheng-Yon | 310/75 C |
| 6,559,564 B1 | * | 5/2003 | Itou | 310/67 A |
| 6,628,021 B2 | * | 9/2003 | Shinohara et al. | 310/68 B |
| 6,794,790 B2 | * | 9/2004 | Kusase et al. | 310/263 |

FOREIGN PATENT DOCUMENTS

| | | | |
|---|---|---|---|
| EP | 591724 A1 | * | 4/1994 |
| EP | 1122094 A | | 8/2001 |
| EP | 1155948 A | | 11/2001 |
| EP | 1270389 A | | 1/2003 |
| EP | 1394030 A1 | | 8/2003 |
| JP | 07-291166 A | | 11/1995 |
| JP | H09-132185 | | 5/1997 |
| JP | 2000-302073 A | | 10/2000 |

* cited by examiner

*Primary Examiner*—Burton Mullins
(74) *Attorney, Agent, or Firm*—Global IP Counselors, LLP

(57) ABSTRACT

A bicycle generator hub is mounted to the front fork of a bicycle and includes a hub shaft, a hub shell, bearings, a generator mechanism and first and second magnetic flux recirculation members. The hub shaft is non-rotatably mounted to the front fork. The hub shell is disposed around the surface of the hub shaft. The bearings are disposed between the hub shell and the hub shaft to enable the hub shell to rotate relative to the hub shaft. The generator mechanism has a coil mounted to the hub shaft and a magnet unit disposed such that the generator mechanism generates electric power via the rotation of the hub shell relative to the hub shaft. The first and second magnetic flux recirculation members are disposed on the hub shaft or the hub shell and return a leaked magnetic flux to the coil.

19 Claims, 10 Drawing Sheets

BICYCLE GENERATOR HUB

CROSS-REFERENCE TO RELATED APPLICATIONS

This application claims priority to Japanese Patent Application No. 2004-252423. The entire disclosure of Japanese Patent Application No. 2004-252423 is hereby incorporated herein by reference.

BACKGROUND OF THE INVENTION

1. Field of the Invention

This invention generally relates to a bicycle generator hub. More specifically, the present invention relates to a bicycle generator hub that rotatably mounts a wheel to a bicycle frame and generates power via the rotation of the wheel.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving various components of the bicycle. One component that has been extensively redesigned is the bicycle hub.

In general, a bicycle hub has an axle or a hub shaft that is detachably and non-rotatably mounted to a bicycle frame. A cylindrical hub shell is rotatably mounted to the hub shaft. Bearings rotatably support the hub shell around the hub shaft. The hub shell is connected to the rim of the wheel by spokes.

A bicycle hub having the above construction and a generator mechanism with a power source incorporated into the hub shell is known in the conventional art (See, Japanese Laid-Open Publication No. H09-132185). In the bicycle generator hub of the prior art, the generator mechanism is placed between the hub shaft and the hub shell. Specifically, a coil is non-rotatably mounted to the hub shaft and magnets are mounted to the inner circumferential surface of the hub shell. The hub shell is used as a yoke that serves as a magnetic path for the magnets. In order to reduce costs, the hub shell is made of iron.

The magnets and coil are surrounded by a magnetic member in that the magnetic iron hub shell also serves as a yoke. Therefore, it is difficult for a magnetic flux, which is generated by the magnets, to become concentrated in the coil. This reduces the power generation efficiency.

In view of the above, it will be apparent to those skilled in the art from this disclosure that there exists a need for an improved bicycle generator hub that facilitates the concentration of the magnetic flux in the coil. This invention addresses this need in the art as well as other needs, which will become apparent to those skilled in the art from this disclosure.

SUMMARY OF THE INVENTION

One object of the present invention is to reduce costs by maximizing the power generation efficiency in a bicycle generator hub.

The bicycle generator hub pertaining to a first aspect of the present invention is a bicycle generator hub that includes a hub shaft, a hub shell, first and second bearings, a generator mechanism and first and second magnetic flux recirculation members. The hub shaft is configured and arranged to be non-rotatably mounted to a bicycle frame. The hub shell is rotatably mounted around the hub shaft. The first and second bearings are disposed between the hub shell and the hub shaft. The generator mechanism has a coil mounted to the hub shaft. The generator mechanism has magnets that are disposed opposite the coil on an inner circumferential surface of the hub shell. The generator mechanism generates electric power from rotation of the hub shell relative to the hub shaft. The first and second magnetic flux recirculation members are disposed on either the hub shaft or the hub shell to return a leaked magnetic flux to the coil.

In the bicycle generator hub of the first aspect of the present invention, the magnets rotate together with the hub shell. When the hub shell rotates, the magnetic flux that is generated by the magnets passes through the coil, thereby generating electric power in the coil. During the rotation, the magnetic flux that leaks from the coil to the outside is returned to the coil via the first and second magnetic flux recirculation members. This results in a large amount of magnetic flux passing through the coil. As a result, regardless of the material of the hub shell, the amount of magnetic flux passing through the coil increases. This maximizes the power generation efficiency and reduces costs.

The bicycle generator hub pertaining to a second aspect of the present invention is the bicycle generator hub according to the first aspect of the present invention, wherein the hub shaft is made of a magnetic metal. In this case, the first and second magnetic flux recirculation members easily recirculate the magnetic flux through the hub shaft to the coil.

The bicycle generator hub pertaining to a third aspect of the present invention is the bicycle generator hub according to the first or second aspects of the present invention, wherein the hub shell includes an essentially cylindrical member. The magnets are mounted to the cylindrical member of the hub shell. The hub shell further includes first and second cap members that are disposed between the cylindrical member and the first and second bearings. The cylindrical member and the first and second cap members are made of different materials. The first and second cap members are made of an inexpensive material that easily recirculates magnetic flux.

The bicycle generator hub pertaining to a fourth aspect of the present invention is the bicycle generator hub according to the third aspect of the present invention, wherein the first and second magnetic flux recirculation members are disposed on the first and second cap members, which rotate together with the magnets. The first and second magnetic flux recirculation members extend toward the sides of the coil. The first and second magnetic flux recirculation members can easily face the coil because they are placed between the cylinder member and the first and second bearings. Because the first and second magnetic flux recirculation members are disposed on the first and second cap members, respectively, the magnetic flux can be easily recirculated to the coil.

The bicycle generator hub pertaining to a fifth aspect of the present invention is the bicycle generator hub according to the fourth aspect of the present invention, wherein the first and second magnetic flux recirculation members are integrally formed with the cap members. Because the first and second magnetic flux recirculation members are integrally formed with the first and second cap members, the first and second magnetic flux recirculation members can be realized using a simple construction.

The bicycle generator hub pertaining to a sixth aspect of the present invention is the bicycle generator hub according to the third aspect of the present invention, wherein the first and second magnetic flux recirculation members extend from the sides of the coil toward the first and second cap members. In this case, the magnetic flux that leaks from the coil can be easily returned to the coil via the first and second cap members.

The bicycle generator hub pertaining to a seventh aspect of the present invention is the bicycle generator hub according to any of the third through sixth aspects of the present invention, wherein the cylindrical member is made of an aluminum alloy and the first and second cap members are made of an iron-based magnetic metal. The magnetic flux passes through the first and second cap members during the recirculation process. Because the cylindrical member is disposed close to the magnets and is made of an aluminum alloy, the magnetic flux from the magnets is not easily dispersed. Dispersion of the magnetic flux is prevented because the first and second cap members are made of an inexpensive iron-based magnetic material that easily conducts the magnetic flux. The construction of the first and second cap members facilitates recirculation of the magnetic flux to the coil. In addition, costs are reduced.

The bicycle generator hub pertaining to an eighth aspect of the present invention is the bicycle generator hub according to any of the third through sixth aspects of the present invention, wherein both the cylindrical member and the first and second cap members are made of an iron-based magnetic metal. In this case, costs are further reduced because the entire hub shell is made of an inexpensive iron-based magnetic metal.

The bicycle generator hub pertaining to a ninth aspect of the present invention is the bicycle generator hub according to any of the third through sixth aspects of the present invention, wherein the first and second magnetic flux recirculation members are mounted to the hub shaft such that they extend toward the sides of the coil. In this case, the first and second magnetic flux recirculation members do not rotate relative to the coil because the first and second magnetic flux recirculation members are mounted to the hub shaft with the coil. With this construction, a gap between the first and second magnetic flux recirculation members and the coil is provided. The gap can be gradually reduced to the extent that the first and second magnetic flux recirculation members are brought into contact with the coil in order to improve recirculation of the magnetic flux.

The bicycle generator hub pertaining to a tenth aspect of the present invention is the bicycle generator hub according to the first aspect of the present invention, wherein the first and second magnetic flux recirculation members are disposed on either the hub shaft or the hub shell with the ends thereof positioned close to the sides of the coil.

In the bicycle generator hub of the tenth aspect, during rotation of the hub shell, the magnetic flux that leaks from the coil is returned to the coil by the first and second magnetic flux recirculation members, which are disposed on the hub shell or the hub shaft. Each of the first and second magnetic flux recirculation members have and end portion that is disposed proximate to the coil. The magnetic flux is returned via one of two paths. The first path is through the hub shaft, the first and second bearings, the hub shell and the first and second magnetic flux recirculation members. The second path is through the hub shaft and the first and second magnetic flux recirculation members. As a result, regardless of the material in the hub shell, the amount of magnetic flux passing through the coil increases. The increase in the amount of magnetic flux increases power generation efficiency and reduces costs.

The bicycle generator hub pertaining to an eleventh aspect of the present invention is a bicycle generator hub according to the first aspect of the present invention, wherein each of the first and second magnetic flux recirculation members have a first end portion that contacts the coil and a second end portion that is disposed proximate to one of the hub shell and hub shaft. The first and second magnetic flux recirculation members return the leaked magnetic flux to the coil.

In the bicycle generator hub of the eleventh aspect of the present invention, during rotation of the hub shell, the magnetic flux that leaks from the coil is returned to the coil by the first and second magnetic flux recirculation members. Each of the first and second magnetic flux recirculation members has a first end portion in contact with the coil and a second end portion that is disposed proximate to one of the hub shell and the hub shaft.

The bicycle generator hub pertaining to a twelfth aspect of the present invention is the bicycle generator hub according to the tenth or eleventh aspect of the present invention, wherein the first and second magnetic flux recirculation members are made of an iron-based metal. In this case, the first and second magnetic flux recirculation members can efficiently recirculate the magnetic flux.

The bicycle generator hub pertaining to a thirteenth aspect of the present invention is the bicycle generator hub according to any of the tenth through twelfth aspects of the present invention, wherein the first and second magnetic flux recirculation members comprise annular members disposed around the hub shaft. In this case, because the end portions of the first and second magnetic flux recirculation members are uniformly close to the hub shell, hub shaft or coil, the magnetic flux can be efficiently recirculated.

The bicycle generator hub pertaining to a fourteenth aspect of the present invention is the bicycle generator hub according to any of the tenth through thirteenth aspects of the present invention, wherein the first and second magnetic flux recirculation members comprise rod-shaped members disposed around the hub shaft. In this case, the first and second magnetic flux recirculation members have a simple construction and are lightweight.

The bicycle generator hub pertaining to a fifteenth aspect of the present invention is a bicycle generator hub that is mounted to a bicycle frame, and includes a hub shaft, a hub shell, first and second bearings and a generator mechanism. The hub shaft is configured and arranged to be non-rotatably mounted to a bicycle frame. The hub shell is rotatably mounted around the hub shaft. The hub shell has a cylindrical member and first and second cap members. The first and second bearings are disposed between the hub shell and the hub shaft. The generator mechanism has a coil mounted to the hub shaft. The generator mechanism has magnets that are disposed opposite the coil on an inner circumferential surface of the hub shell. The generator mechanism generates electric power from rotation of the hub shell relative to the hub shaft. The first and second cap members are disposed between the first and second bearings, respectively, and the cylindrical member. Each of the first and second cap members are bent towards the coil to form first and second magnetic flux recirculation members, respectively. Each of the first and second magnetic flux recirculation members has an end portion that is proximate to the coil.

In the bicycle generator hub of the fifteenth aspect of the present invention, during the rotation of the hub shell, the magnetic flux that leaks from the coil is returned to the coil by the first and second magnetic flux recirculation members, which are formed from the first and second cap members, respectively. As a result, regardless of the material of the hub shell, the amount of magnetic flux passing through the coil increases. This increase in the amount of magnetic flux increases power generation efficiency and reduces costs. Furthermore, the first and second magnetic flux recirculation members are easily formed by bending the first and second cap members.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
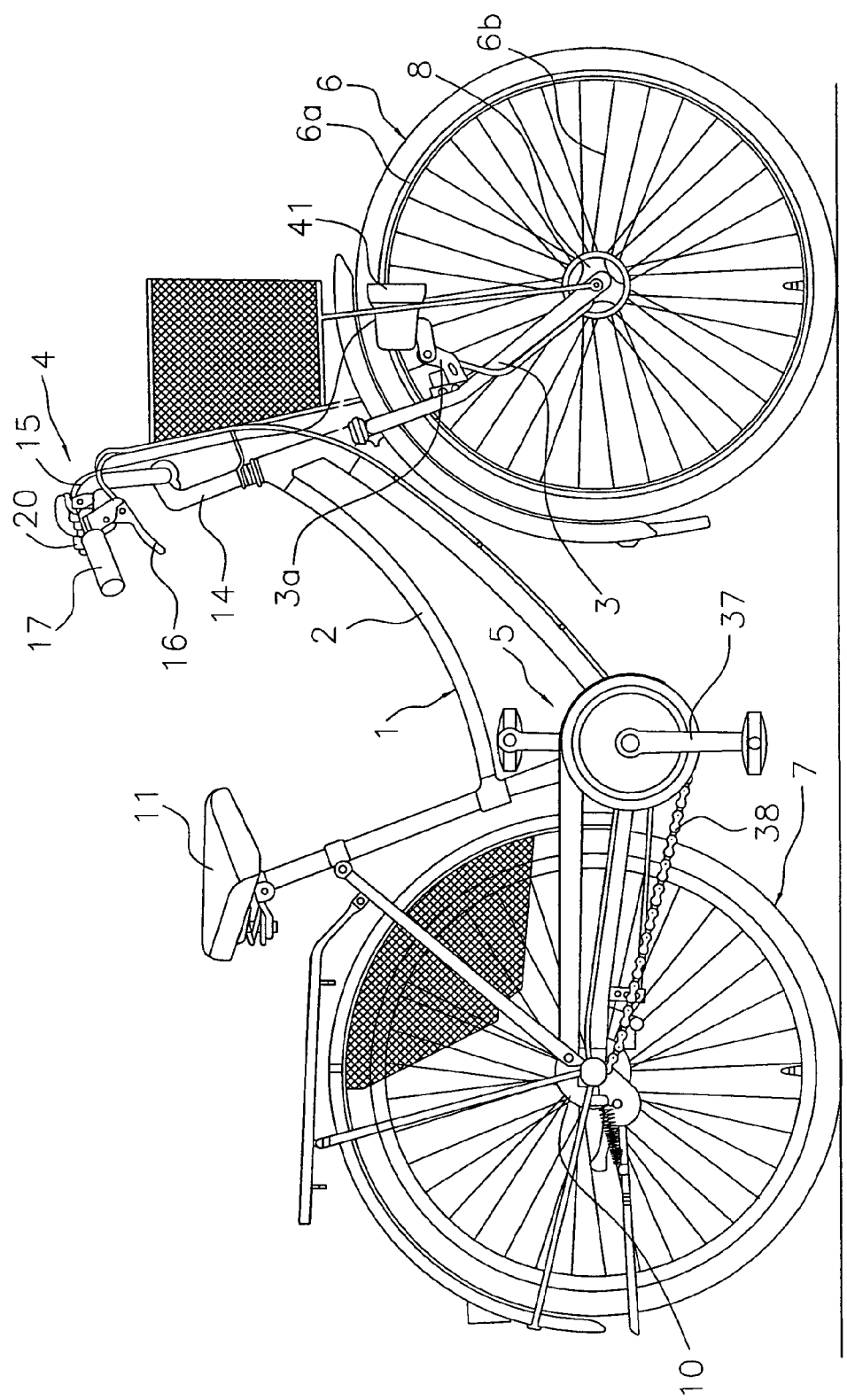
FIG. 1 is a side elevational view of a bicycle equipped with a bicycle generator hub in accordance with a first embodiment of the present invention.

Referring initially to FIG. 1, a bicycle with a bicycle generator hub 8 is illustrated in accordance with a first embodiment of the present invention. The bicycle is lightweight and includes a frame 1, a handle unit 4, a drive unit 5, a front wheel 6, a rear wheel 7, a saddle 11 and a lamp 41. The frame 1 has a double-loop frame body 2 and a front fork 3. The front wheel 6 includes a bicycle generator hub 8.

The double-loop frame body 2 of the frame 1 is built by welding pipes together. Various units such as the saddle 11 and the drive unit 5 are mounted to the frame body 2. The front fork 3 is movably mounted to the front part of the frame body 2 such that it can rotate around an angled axis. The front wheel 6 includes a rim 6a and a plurality of spokes 6b extending between the generator hub 8 and the rim 6a. The front wheel 6 is mounted to the front fork 3 by the generator hub 8. The lamp 41 is mounted to the front fork 3 at roughly the midpoint thereof.

The handle unit 4 has a handle stem 14, a handlebar 15, a pair of brake levers 16 (only one side shown), a pair of grips 17 (only one side shown) and a gear shift operation unit 20. The brake levers 16 and the grips 17 are mounted to either end of the handlebar 15. The gear shift operation unit 20 is integrally formed with the right brake lever 16. The handle stem 14 is secured to the top of the front fork 3. The handlebar 15 is secured to the upper end of the handle stem 14 in a conventional manner.

The drive unit 5 basically has a gear crank 37, a chain 38, and an internal gear shift hub 10. The internal gear shift hub 10 is a three-speed internal gear shift hub having three gears. The internal gear shift hub 10 is shifted by operating the gear shift operation unit 20. The internal gear shift hub 10 is mounted to the rear wheel 7. The gear crank 37 is disposed at the bottom of the frame body 2 (on a hanger unit). The chain 38 is suspended around the gear crank 37.

Figure 2:
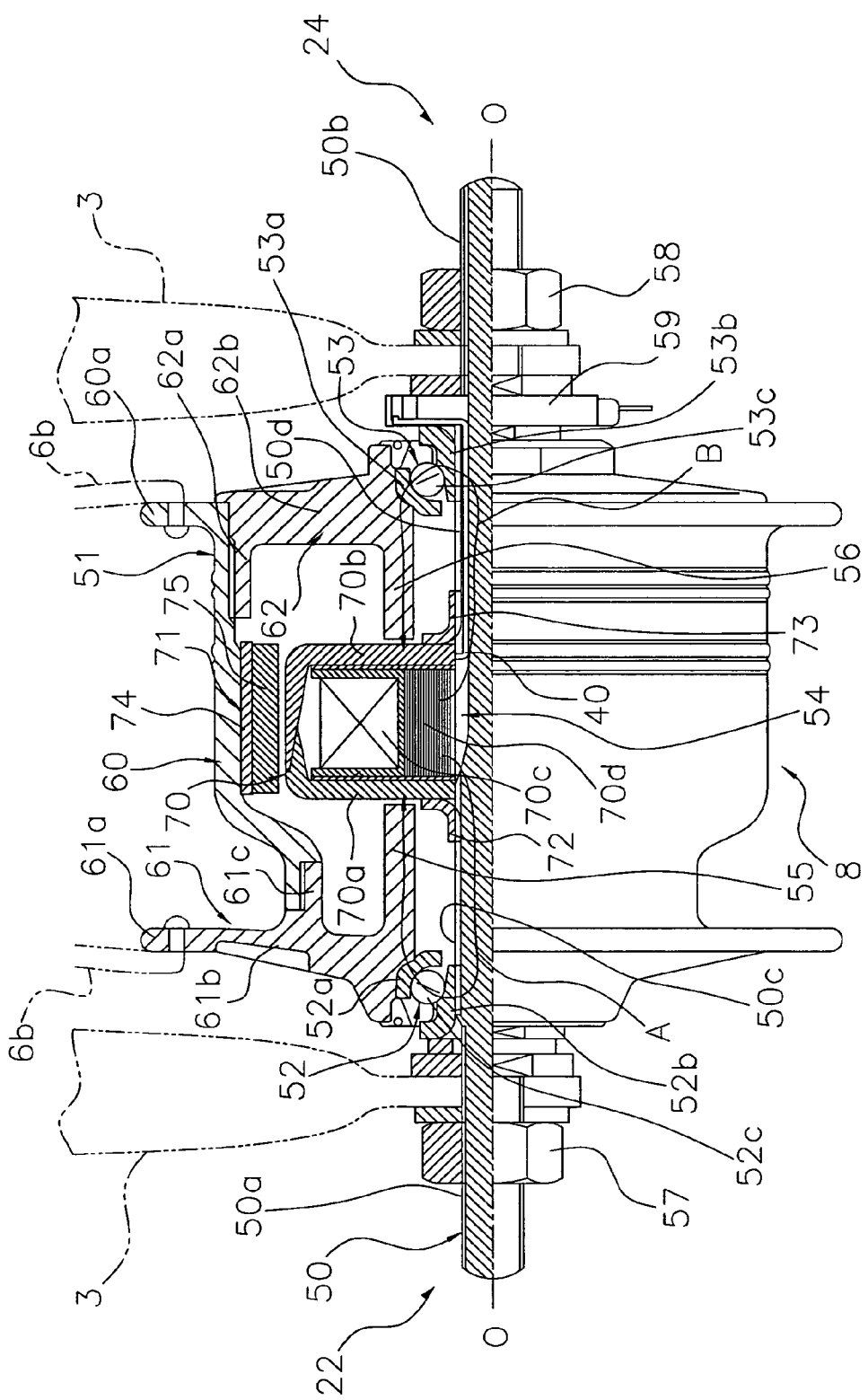
FIG. 2 is a partial cross-sectional view of the bicycle generator hub coupled to the front fork of the bicycle illustrated in FIG. 1 in accordance with the first embodiment of the present invention.

Referring to FIG. 2, the bicycle generator hub 8 rotatably mounts the front wheel 6 to the front fork 3. The bicycle generator hub 8 includes a first end portion 22, a second end portion 24, a hub shaft 50, a hub shell 51, first and second bearings 52 and 53, a generator mechanism 54 and first and second magnetic flux recirculation members 55 and 56. The hub shaft 50 is non-rotatably mounted to the front fork 3. The hub shell 51 is disposed coaxially around the outer circumference of the hub shaft 50. The first and second bearings 52 and 53 are disposed between the hub shaft 50 and the hub shell 51. The first and second bearings 52 and 53 enable the hub shell 51 to be mounted such that it can rotate relative to the hub shaft 50. The generator mechanism 54 generates power from rotation of the hub shell 51 relative to the hub shaft 50. The first and second magnetic flux recirculation members 55 and 56 are integrally formed with the hub shell 51, as shown in FIG. 2.

The hub shaft 50 includes first and second small diameter threads 50a and 50b, a large diameter thread 50c and a wiring path groove 50d. The first and second small diameter threads 50a and 50b are each located at the first and second end portions 22 and 24, respectively. The large diameter threads 50c are located between the first and second small diameter threads 50a and 50b. The hub shaft 50 is magnetic and is made of an iron-based metal, such as structural carbon steel or a structural steel alloy. The first and second small-diameter threads 50a and 50b secure the hub shaft 50 to the front fork 3. The first and second small-diameter threads 50a and 50b secure the first and second bearings 52 and 53, respectively, between the hub shaft 50 and the hub shell 51. The large-diameter threads 50c provide a mounting area for the generator mechanism 54. The wiring path groove 50d is formed in the outer circumferential surface of the hub shaft 50 and runs from the mounting area of the generator mechanism 54 to the second end portion 24 (the right side as viewed in FIG. 2). The hub shaft 50 is non-rotatably secured to the ends of the front fork 3 by first and second nuts 57 and 58. The first and second small-diameter threads 50a and 50b are threaded into the first and second nuts 57 and 58, respectively. An external current draw terminal 59 is mounted to the second end portion 24 of the hub shaft 50. The external current draw terminal 59 is connected to the lamp 41, for example. The external current draw terminal 59 is electrically connected to the generator mechanism 54 via internal wiring 40. The internal wiring 40 is preferably located in the wiring path groove 50d.

As is illustrated in FIG. 2, the hub shell 51 has a cylindrical hub drum or cylindrical member 60 and first and second or left and right cap members 61 and 62. The first and second cap members 61 and 62 are non-rotatably mounted at either end of the hub drum 60. The hub drum 60 has a small-diameter area proximate the first end portion 22 of the bicycle generator hub 8. The hub drum 60 also has a large-diameter area that is adjacent to the small-diameter area and extends to the second end portion 24 of the bicycle generator hub 8. The small-diameter area of the hub drum 60 has a smaller diameter than the large-diameter area of the hub drum 60. The hub drum 60 is made of an aluminum alloy, for example. The generator mechanism 54 is disposed between the large-diameter area of the hub drum 60 and the hub shaft 50. At the end of the hub drum 60, closest to the second end portion 24, a hub flange 60a is formed such that it extends outward in the radial direction from the large-diameter area of the hub drum 60. The hub flange 60a engages the spokes 6b that connect to the rim 6a of the front wheel 6.

The first cap member 61 is non-rotatably crimped to the small-diameter area of the hub drum 60 and fastened via serrations, for example. The first cap member 61 is made of an iron-based metal, such as structural carbon steel or a structural steel alloy. The first cap member 61 has a hub flange 61a, a first disk 61b, and a cylindrical first connector 61c. The first bearing 52 is mounted inside the inner circumference of the first disk 61b. In addition, the first magnetic flux recirculation member 55 is integrally formed as a cylinder. The hub flange 60a engages with the spokes 6b. The first disk 61b is disposed such that it extends from the hub flange 61a to a mounting area of the first bearing 52. The cylindrical first connector 61c is formed to extend from the radial midsection of the first disk 61b such that it faces the hub drum 60.

The second cap member 62 is made of an iron-based metal having a magnetic property such as structural carbon steel or a structural steel alloy. The second cap member 62 engages with an inner circumference of the right side of the hub drum 60 via threads, for example. The second cap member 62 has a second connector 62a that is disposed on the inner circumferential surface of the hub drum 60 and threads into the hub drum 60. The second cap member 62 also has a second disk 62b that extends from the second connector 62a to a mounting area of the second bearing 53. The second bearing 53 is mounted inside the inner circumference of the second disk 62b. In addition, the second magnetic flux recirculation member 56 is integrally formed as a cylinder.

The first bearing 52 has a first cup 52a, a first crown cone 52b, and a plurality of first steel balls 52c. The second bearing 53 has a second cup 53a, a second crown cone 53b, and a plurality of second steel balls 53c. The first and second cups 52a and 53a are mounted to the first and second cap members 61 and 62, respectively. The first and second crown cones 52b and 53b are threaded onto the first and second small-diameter threads 50a and 50b, respectively, of the hub shaft 50. The first steel balls 52c are disposed between the first cup 52a and the first crown cone 52b. The first cup 52a and the first crown cone 52b are in contact with the first steel balls 52c. The second steel balls 53c are disposed between the second cup 53a and the second crown cone 53b. The second cup 53a and the second crown cone 53b are in contact with the second steel balls 53c.

The generator mechanism 54 is mounted on the large-diameter threads 50c. The generator mechanism 54 includes a coil 70 and a magnet unit 71. The coil 70 of the generator mechanism 54 has a claw-pole type coil that is non-rotatably mounted to the hub shaft 50. The coil 70 is non-rotatably secured to the hub shaft 50 by first and second nut members 72 and 73 that are threaded onto the large-diameter threads 50c. The coil 70 includes a pair of claw-type secured yokes 70a and 70b disposed in an alternating fashion. The coil 70 further includes a coil unit 70c and a core yoke 70d. The coil unit 70c is disposed between the secured yokes 70a and 70b. The core yoke 70d is disposed inside the coil unit 70c. The coil 70 is electrically connected to the external current draw terminal 59 via internal wiring 40. The first magnetic flux recirculation member 55 extends from the mounting area of the first bearing 52 towards the coil 70. Likewise, the second magnetic flux recirculation member 56 extends from the mounting area of the second bearing 53 towards the coil 70.

The magnet unit 71 of the generator mechanism 54 is disposed on the inner circumferential surface of the hub drum 60 of the hub shell 51 such that it faces the coil 70. The magnet unit 71 has a cylindrical rotating yoke 74 and multiple (four, for example) permanent magnets 75. The cylindrical rotating yoke 74 is press-fit into the inner circumferential surface of the hub drum 60. The magnets 75 are mounted circumferentially on the inner circumferential surface of the rotating yoke 74 with gaps therebetween. The rotating yoke 74 is made of an iron-based metal, such as structural carbon steel or a structural steel alloy. Each permanent magnet 75 has alternating N poles and S poles such that a total of twenty-eight poles can face the secured yokes 70a and 70b.

The first and second magnetic flux recirculation members 55 and 56 are cylindrical members that are integrally formed with the first and second cap members 61 and 62, respectively. Each of the first and second magnetic flux recirculation members 55 and 56 has an end portion that is disposed proximate to the coil 70. Specifically, the distance between the ends of the first and second magnetic flux recirculation members 55 and 56 and the sides of the coil 70 ranges from 1 mm to 12 mm. The first and second magnetic flux recirculation members 55 and 56 are integrally formed with the first and second cap members 61 and 62, respectively, and therefore rotate when the bicycle is moving. Accordingly, if the distance is smaller than 1 mm, there is a danger that the end portions of the first and second magnetic flux recirculation members 55 and 56 that are proximate to the coil 70 will contact the sides of the coil 70. The danger depends on the degree of precision with which the bicycle generator hub 8 was assembled.

The generation of power by the bicycle generator hub 8 will now be described. When the front wheel 6 rotates, the magnet unit 71 rotates as well. When this occurs, the magnet unit 71 rotates around the secured yokes 70a and 70b. As a result, when one of the secured yokes 70a or 70b receives N-pole magnetic flux from the magnet unit 71, the other secured yoke 70a or 70b receives S-pole magnetic flux. Conversely, when one of the securing yokes 70a or 70b receives S-pole magnetic flux from the magnet unit 71, the other secured yoke 70a or 70b receives N-pole magnetic flux. In other words, due to the rotation of the magnet unit 71 around the secured yokes 70a and 70b, the coil 70 repeatedly alternates between a first state and a second state. In a first state, for example, the secured yoke 70a receives N-pole magnetic flux and the secured yoke 70b receives S-pole magnetic flux. In a second state, for example, the secured yoke 70a receives S-pole magnetic flux and the secured yoke 70b receives N-pole magnetic flux. Referring to FIG. 2, alternating magnetic flux is generated in the axial 0-0 direction in the core yoke 70d, which electrically connects the secured yokes 70a and 70b. As a result of the alternating magnetic flux being generated inside the coil unit 70c, electric current is generated in the coil unit 70c. Accordingly, electric power is generated and sent from the external current draw terminal 59 to the lamp 41 via the internal wiring 40.

When power is generated, part of the alternating magnetic flux leaks out into the hub shaft 50 from the coil 70, as shown by the arrows A and B in FIG. 2. However, the leaked magnetic flux reaches the first and second magnetic flux recirculation members 55 and 56 via the first and second bearings 52 and 53 and the first and second cap members 61 and 62, respectively. The leaked magnetic flux returns to the coil 70 via the end portions of the first and second magnetic flux recirculation members 55 and 56. As a result, the magnetic flux that passes through the coil unit 70c increases, thereby increasing power generating efficiency.

Figure 3:
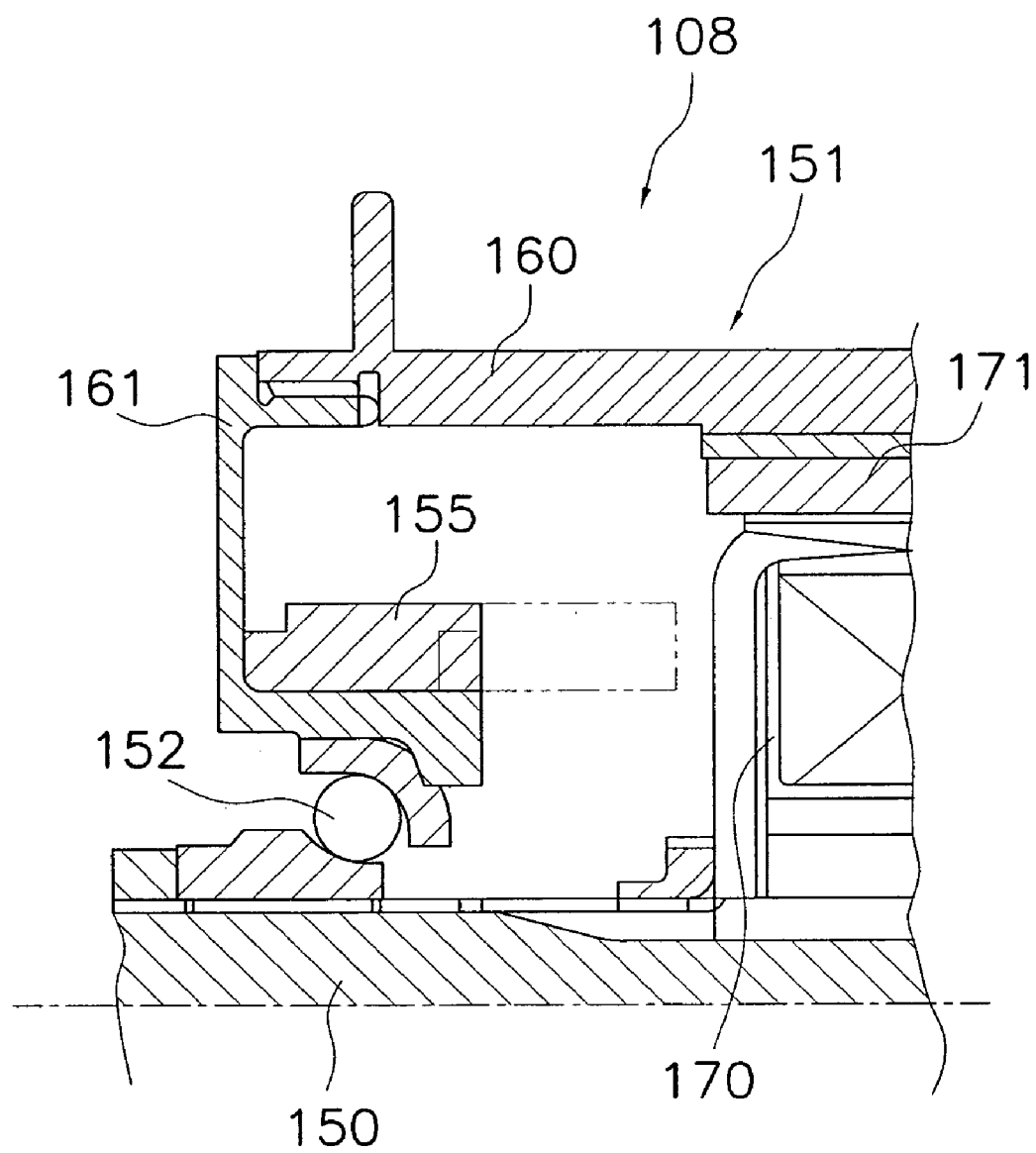
FIG. 3 is an enlarged partial cross-sectional view of a generator hub evaluation mechanism used in experiments to establish the effectiveness of the present invention.

A generator hub evaluation mechanism 108, shown in FIG. 3, was used to perform experiments in order to confirm the unique characteristics of the invention detailed above. The generator hub evaluation mechanism 108 includes a hub shaft 150, a cylindrical hub shell 151, a first bearing 152, a second bearing (not shown), a first magnetic flux recirculation member 155 and a second magnetic flux recirculation member (not shown). The hub shell 151 has a cylindrical hub drum 160, a first cap member 161 and a second cap member (not shown). The first and second cap members 161 are disposed at either end of the hub drum 160. The first magnetic flux recirculation member 155 is disposed in a mounting area of the first bearing 152 of the first cap member 161. The first magnetic flux recirculation member 155 is structured to move in the hub axial direction. The generator hub evaluation mechanism 108 further includes a coil 170 and a magnet unit 171. The coil 170 is non-rotatably mounted to the hub shaft 150. The magnet unit 171 is secured to an inner circumferential surface of the hub drum 160.

Figure 4:
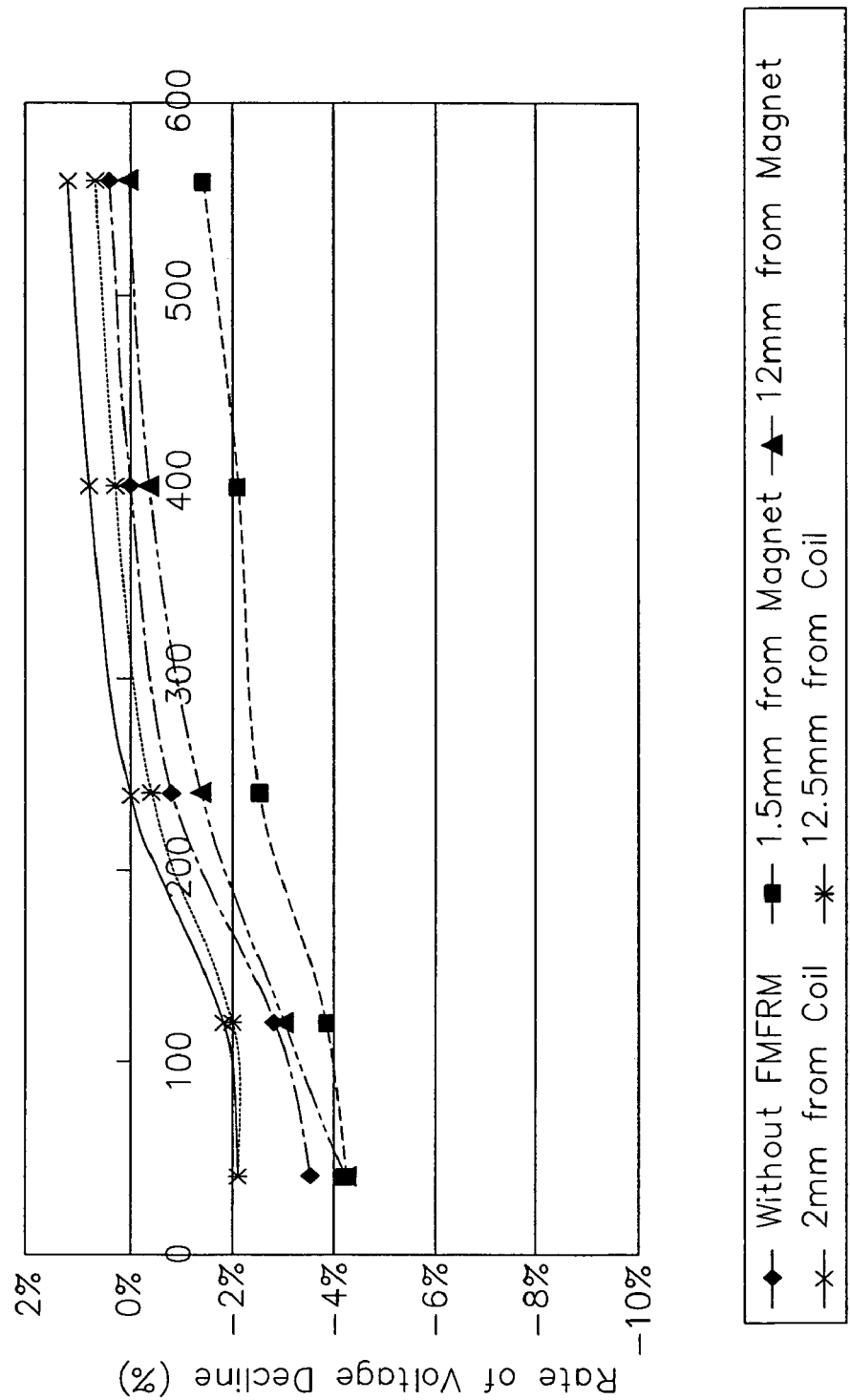
FIG. 4 is a graph showing results from experiments with the generator hub evaluation mechanism of FIG. 3 that is made of aluminum alloy and structural carbon steel.
Figure 5:
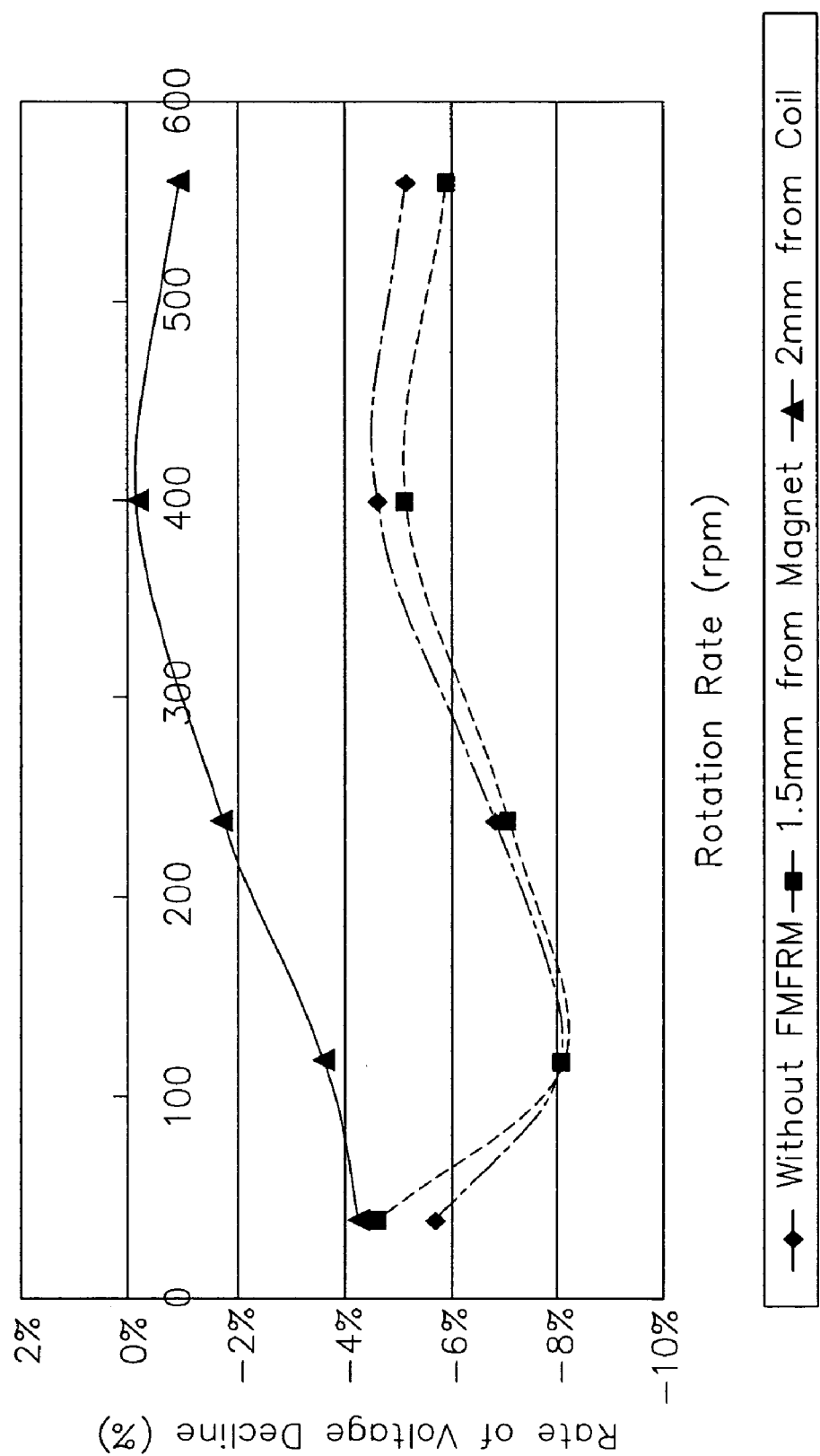
FIG. 5 is a graph showing results from experiments with the generator hub evaluation mechanism of FIG. 3 that is made of structural carbon steel.

FIGS. 4 and 5 show graphs measuring the relationship between the rotation rate and the rate of decline in generated voltage using the generator hub evaluation mechanism 108 shown in FIG. 3.

FIG. 4 is a graph representing a situation in which the hub drum 160 is made of an aluminum alloy (A6061, for example) and first and second cap members 161 are made of structural carbon steel (S15C, for example). FIG. 5 is a graph representing a situation in which both the hub drum 160 and the first and second cap members 161 are made of structural carbon steel (S 15C, for example). Here, experiments were performed in which first and second magnetic flux recirculation members 155 were made of carbon steel. The first and second magnetic flux recirculation members 155 were placed in various positions. The relationship between the rotation rate and the rate of voltage decline was measured for the various positions.

In FIG. 4, the line marked by the letter 'X' shows the case in which a 2 mm gap is between the coil 170 and an end portion of each of the first magnetic flux recirculation member 155 and second magnetic flux recirculation member. The possible positions of the end portion of the first magnetic flux recirculation member 155 are indicated by a broken line in FIG. 3. The 2 mm position is indicated by the vertical broken line in FIG. 3. The line marked by asterisks in FIG. 4 shows an instance in which the gap was 12.5 mm. The position of the first magnetic flux recirculation member 155 for the 12.5 mm gap is indicated by the solid lines in FIG. 3. The line marked by diamonds in FIG. 4 shows the case in which there was not a first magnetic flux recirculation member (FMFRM) 155. The line marked by triangles in FIG. 4 shows the case in which the gap between each of the first and second magnetic flux recirculation members 155 and the magnet unit 171 was 12 mm. The line marked by squares in FIG. 4 shows the case in which the gap between each of the first and second magnetic flux recirculation members 155 and the magnet unit 171 was a mere 1.5 mm. As is clear from FIG. 4, the rate of voltage decline increases as the magnet unit 171 becomes closer to the first and second magnetic flux recirculation members 155. This is thought to be due to the dispersal of the magnetic field generated from the magnet unit 171. The rate of voltage decline decreases as the first and second magnetic flux recirculation members 155 are placed closer to the coil 170. The fact that the rate of voltage decline becomes positive appears to be a measurement error. As a result, it was confirmed that if first and second magnetic flux recirculation members 155 are to be used, it is more effective to place them next to the coil 170 than next to the magnet unit 171.

In FIG. 5, the line marked by triangles shows the case in which a 2 mm gap is between the coil 170 and an end portion of each of the first and second magnetic flux recirculation members 155. The line marked by diamonds in FIG. 5 shows the case in which no first magnetic flux recirculation member (FMFRM) 155 was used. The line marked by squares in FIG. 5 shows the case in which the gap between the magnet unit 171 and each of the first and second magnetic flux recirculation members 155 was 1.5 mm.

As is clear from these two graphs, when the first and second magnetic flux recirculation members 155 come close to the coil 170, the rate of voltage decline decreases. When the first and second magnetic flux recirculation members 155 come close to the magnet unit 171, the rate of voltage decline increases. This tendency holds true even if the material used for the hub drum 160 is changed. As a result, it was determined that the power generation efficiency increases regardless of the material of the hub shell simply by bringing the end portion of the first and second magnetic flux recirculation members 155 closer to the coil 170.

During rotation of the magnet unit 171, the leaked magnetic flux is returned to the coil 170 by the first and second magnetic flux recirculation members 155 via the hub shaft 150. Accordingly, the amount of magnetic flux passing through the coil 170 increases. The increased amount of magnetic flux passing through the coil 170 prevents deterioration in power generation efficiency and reduces costs.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

Second Embodiment

Figure 6:
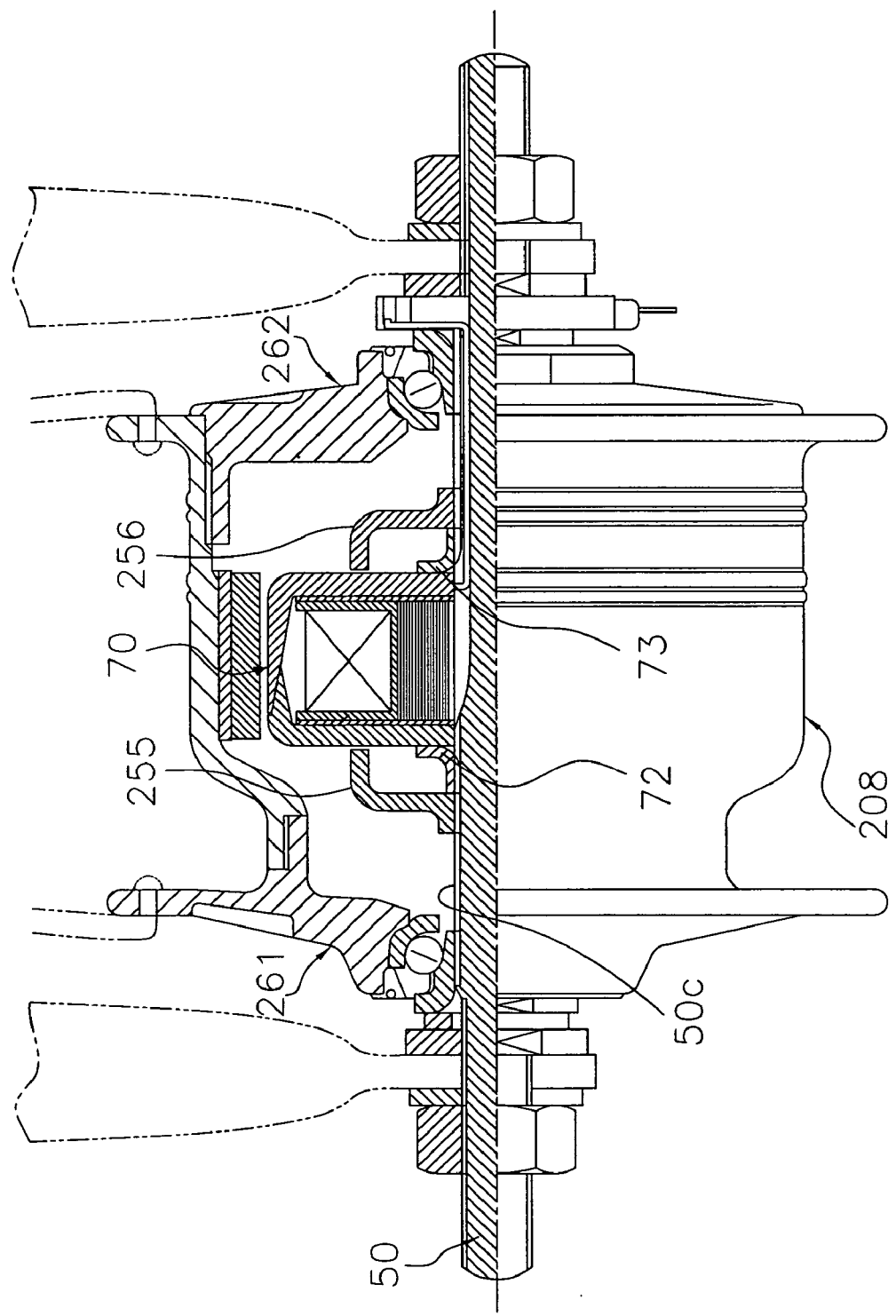
FIG. 6 is a partial cross-sectional view of a bicycle generator hub coupled to the front fork of the bicycle illustrated in FIG. 1 in accordance with a second embodiment of the present invention.

Referring now to FIG. 6, a bicycle generator hub 208 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The bicycle generator hub 208 is essentially the same as in the first embodiment except that the first and second magnetic flux recirculation members 255 and 256 are not directly attached to the first and second cap members 261 and 262. Referring to FIG. 6, the first and second magnetic flux recirculation members 255 and 256 are annular members that are threaded onto the large-diameter thread 50c of the hub shaft 50. The coil 70 is located on the hub shaft 50 between the first and second nut members 72 and 73. The coil 70 is non-rotatably secured to the hub shaft 50 by the first and second nut members 72 and 73. The first and second magnetic flux recirculation members 255 and 256 abut the first and second nut members 72 and 73, respectively, on their outer axial side. Each of the first and second magnetic flux recirculation members 255 and 256 has an end portion that is proximate to the coil 70. The first and second magnetic flux recirculation members 255 and 256 are cylindrical members. In this embodiment, the first and second magnetic flux recirculation members 255 and 256 do not rotate relative to the coil 70 because they are directly attached to the hub shaft 50. Because of this, the end portions of the first and second magnetic flux recirculation members 255 and 256 can be brought closer to the coil 70 and can even be brought into contact with the coil 70.

Third Embodiment

Figure 7:
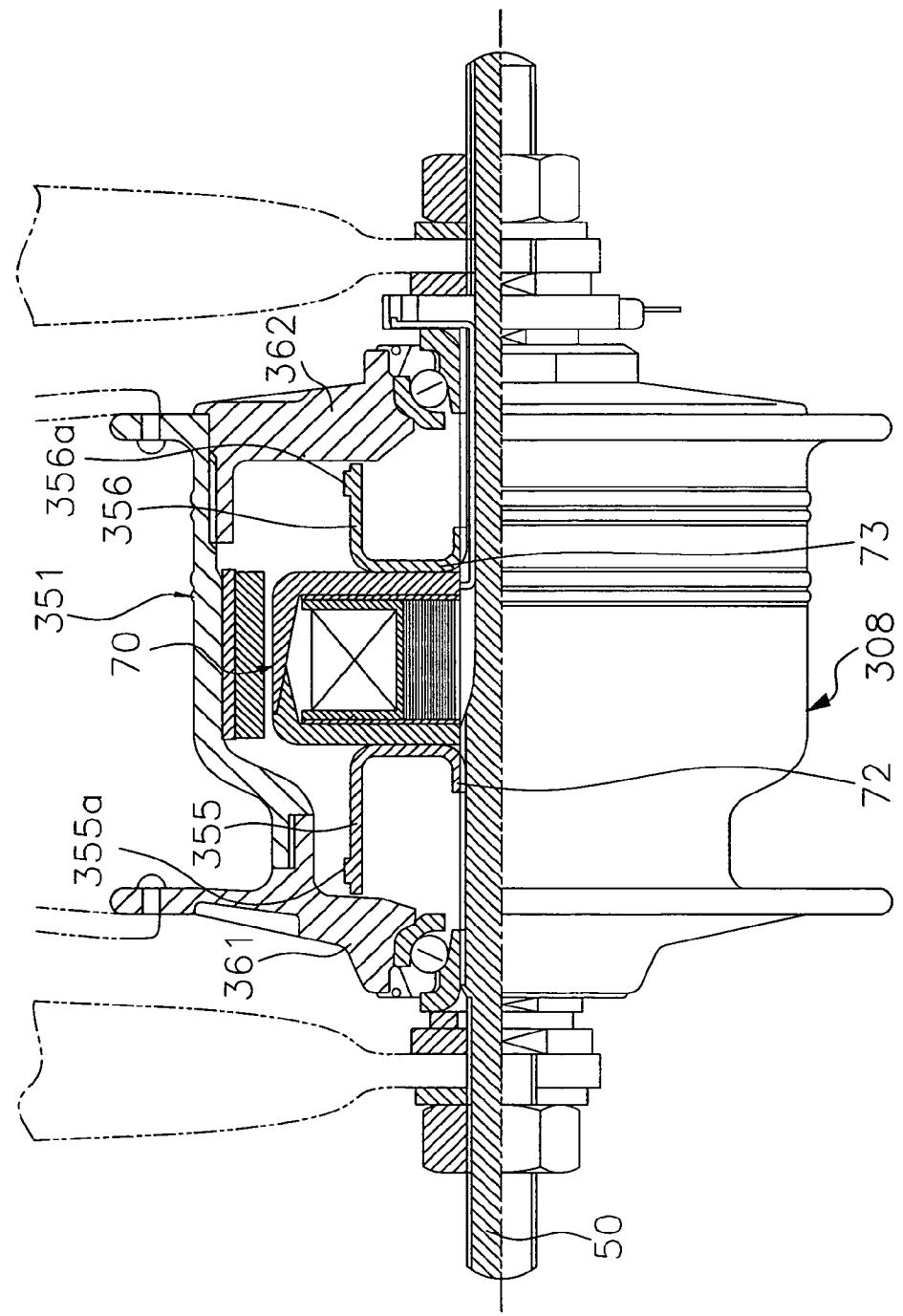
FIG. 7 is a partial cross-sectional view of a bicycle generator hub coupled to the front fork of the bicycle illustrated in FIG. 1 in accordance with a third embodiment of the present invention.

Referring now to FIG. 7, a bicycle generator hub 308 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The bicycle generator hub 308 is essentially the same as in the first embodiment except that the first and second magnetic flux recirculation members 355 and 356 contact the coil 70 and are proximate to the first and second cap members 361 and 362. Specifically, as is illustrated in FIG. 7, each of the first and second magnetic flux recirculation members 355 and 356 has a first end portion that contacts the coil 70 and a second end portion that is disposed proximate to the hub shell 351. More specifically, each of the second end portions of the first and second magnetic flux recirculation members 355 and 356 is disposed proximate to the first and second cap members 361 and 362, respectively.

The first and second magnetic flux recirculation members 355 and 356 are annular members disposed around the circumference of the hub shaft 50. The coil 70 is located on the hub shaft 50 between the first and second nut members 72 and 73. The coil 70 is non-rotatably secured to the hub shaft 50 by the first and second nut members 72 and 73. In FIG. 7, the first and second magnetic flux recirculation members 355 and 356 are integrally formed with the first and second nut members 72 and 73. However, it will be apparent to one of skill in the art that the first and second magnetic flux recirculation members 355 and 356 may be formed independently of the first and second nut members 72 and 73. The first and second magnetic flux recirculation members 355 and 356 have first and second tool engagement areas 355a and 356a, respectively. The first and second tool engagement areas 355a and 356a provide a means for various tools to engage the first and second magnetic flux recirculation members 355 and 356 and the first and second nut members 72 and 73. The first and second tool engagement areas 355a and 356a are formed on outer circumferential surfaces of the first and second magnetic flux recirculation members 355 and 356, respectively. The first and second tool engagement areas 355a and 356a have multiple protrusions around the circumferential direction.

Fourth Embodiment

Figure 8:
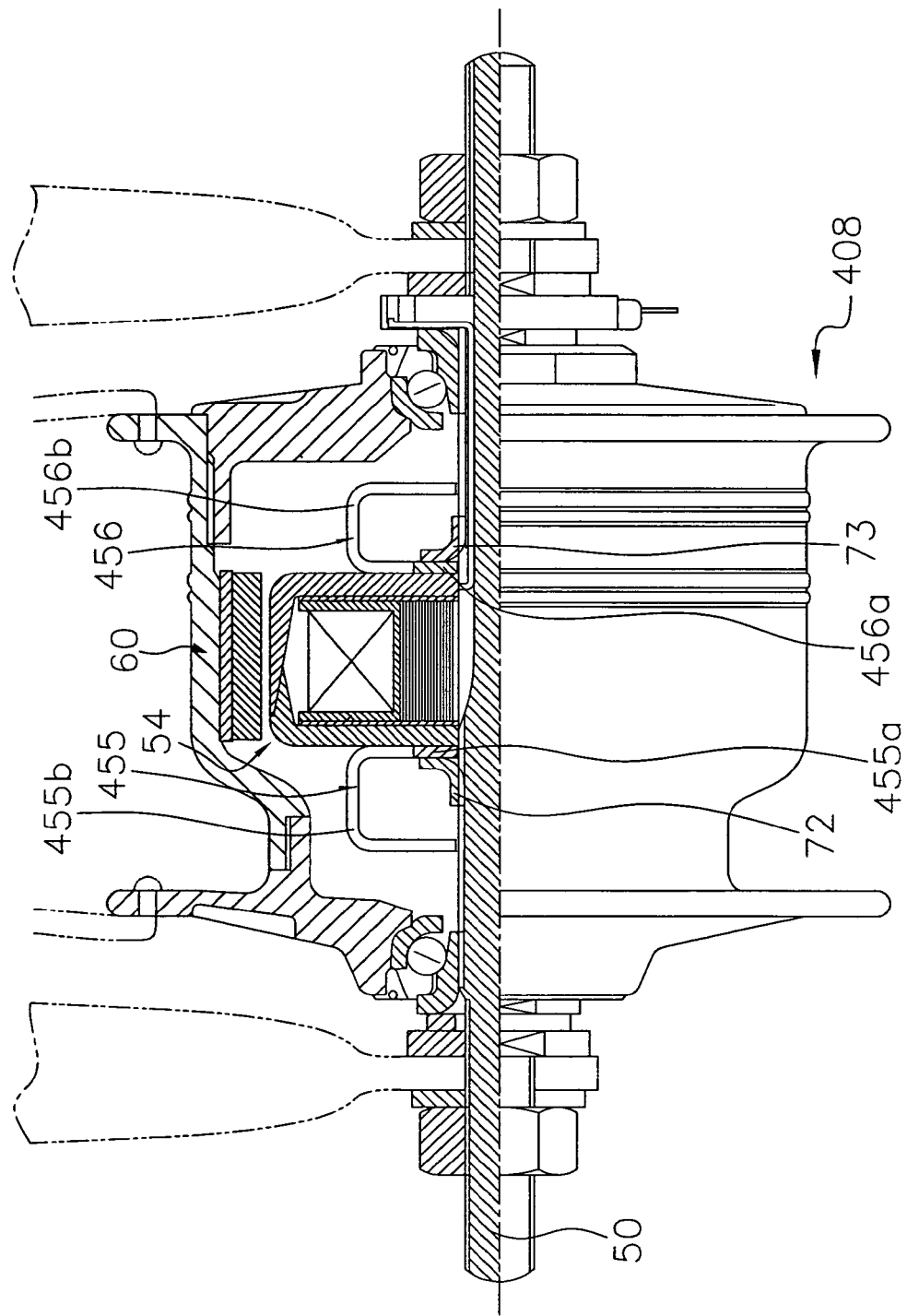
FIG. 8 is a partial cross-sectional view of a bicycle generator hub coupled to the front fork of the bicycle illustrated in FIG. 1 in accordance with a fourth embodiment of the present invention.

Referring now to FIG. 8, a bicycle generator hub 408 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The bicycle generator hub 408 is essentially the same as in the first embodiment except that the first and second magnetic flux recirculation members 455 and 456 contact the coil 70 and are proximate to the hub shaft 50. Specifically, as is illustrated in FIG. 8, each of the first and second magnetic flux recirculation members 455 and 456 has a first end portion that contacts the coil 70 and a second end portion that is disposed proximate to the hub shaft 50. The coil 70 is located on the hub shaft 50 between the first and second nut members 72 and 73. In this embodiment, the first and second magnetic flux recirculation members 455 and 456 as well as the coil 70 are secured using the first and second nut members 72 and 73, respectively.

The first and second magnetic flux recirculation members 455 and 456 are annular members disposed around the circumference of the hub shaft 50. The first and second magnetic flux recirculation members 455 and 456 have first and second ring-shaped securing units 455a and 456a and first and second rod-shaped members 455b and 456b, respectively. The first and second ring-shaped securing units 455a and 456a are respectively secured to the first and second nut members 72 and 73. The first and second rod-shaped members 455b and 456b extend in the radial direction from the first and second securing units 455a and 456a, respectively. Each of the first and second rod-shaped members 455b and 456b are bent twice such that each of the second end portions of the first and second magnetic flux recirculation members 455 and 456 is proximate to the hub shaft 50.

Fifth Embodiment

Figure 9:
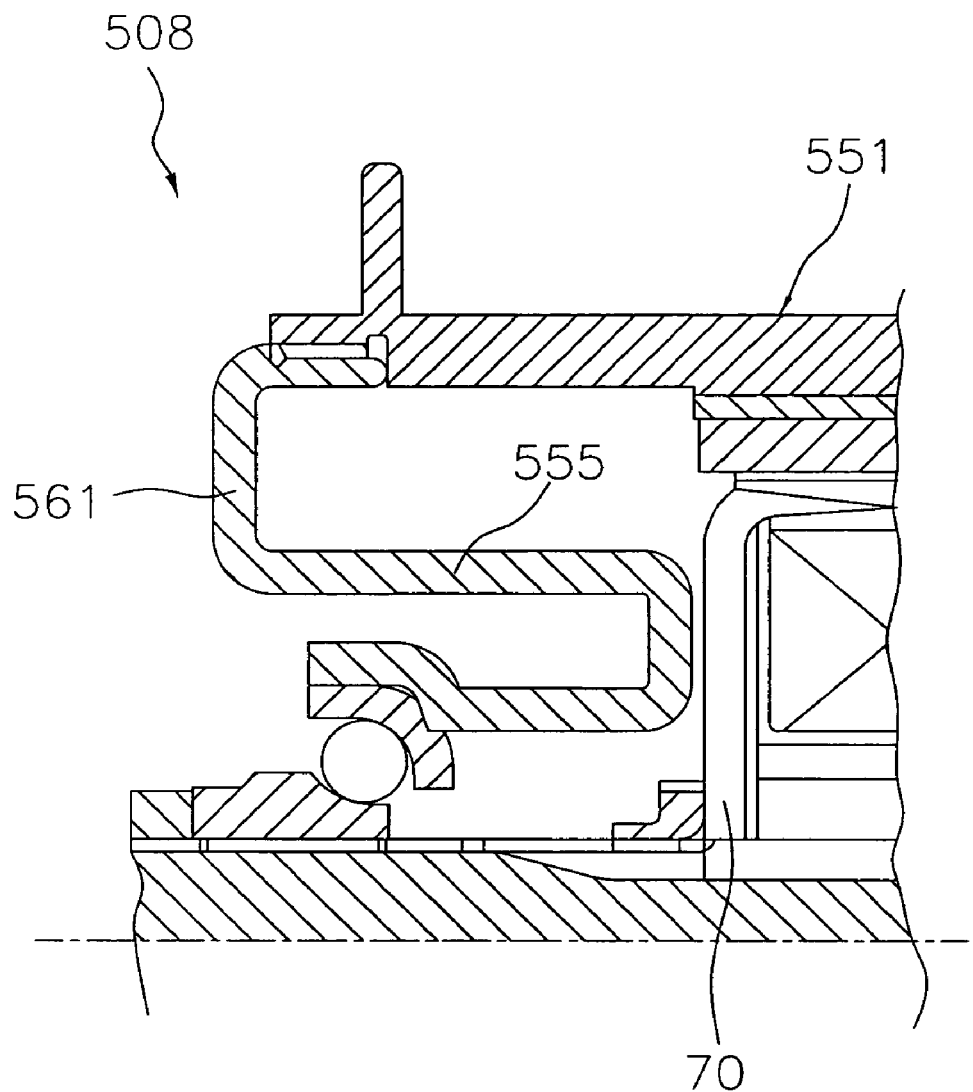
FIG. 9 is a partial cross-sectional view of a bicycle generator hub coupled to the front fork of the bicycle illustrated in FIG. 1 in accordance with a fifth embodiment of the present invention.

Referring now to FIG. 9, a bicycle generator hub 508 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The bicycle generator hub 508 is essentially the same as in the first embodiment except that the first magnetic flux recirculation member 555 and the second magnetic flux recirculation member (not shown) are formed by bending a portion of the hub shell 551. Specifically, as is illustrated in FIG. 9, the first cap member 561 of the hub shell 551 is formed via press-molding. More specifically, the first magnetic flux recirculation member 555 is formed by bending a center portion of the first cap member 561 in the shape of the letter 'U', for example. The first magnetic flux recirculation member 555 is bent toward the coil 70 such that a portion of the first magnetic flux recirculation member 555 is proximate to the coil 70.

Sixth Embodiment

Figure 10:
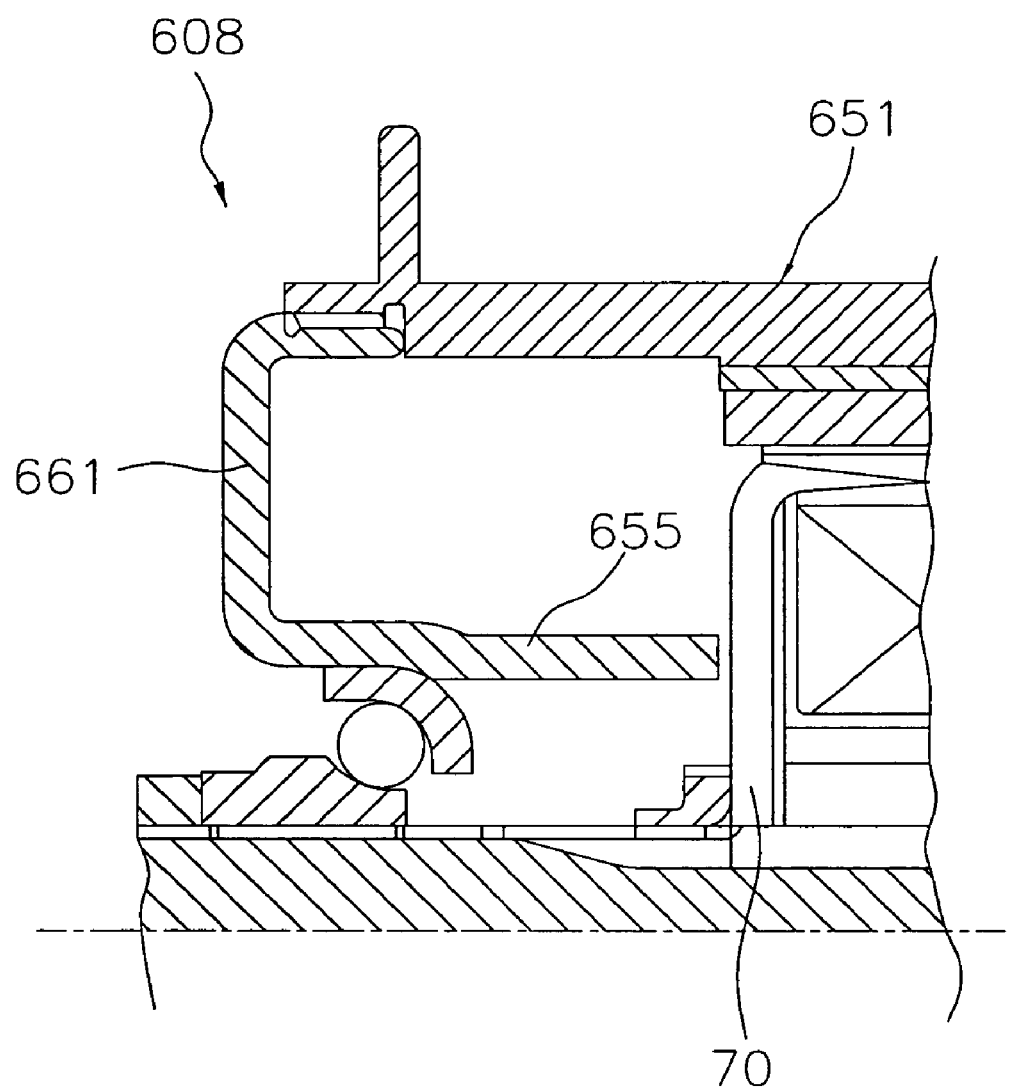
FIG. 10 is partial cross-sectional view of a bicycle generator hub coupled to the front fork of the bicycle illustrated in FIG. 1 in accordance with a sixth embodiment of the present invention.

Referring now to FIG. 10, a bicycle generator hub 608 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

The bicycle generator hub 608 is essentially the same as in the first embodiment except that the first magnetic flux recirculation member 655 and the second magnetic flux recirculation member (not shown) are formed by bending a portion of the hub shell 651. Specifically, as is illustrated in FIG. 10, the first cap member 661 of the hub shell 651 is formed by press-molding. More specifically, the first magnetic flux recirculation member 655 is formed by bending a center portion of the first cap member 661 such that it extends toward the coil 70 from the bearing mounting area of the first cap member 661. The first magnetic flux recirculation member 655 is substantially in the shape of an "I". An end portion of the first magnetic flux recirculation member 655 is proximate to the side of the coil 70, as shown in FIG. 10.

In the above embodiments, first and second magnetic flux recirculation members are used. However, where the generator mechanism is disposed closer to one end of the hub shell, only one magnetic flux recirculation member is needed. The single magnetic flux recirculation member is preferably disposed on the side of the generator mechanism in which there is a larger gap between the generator mechanism and the end of the hub shell.

In the above embodiments, the present invention was described in relation to the front wheel 6, but it will be clear to one of skill in the art that the present invention may also be applied to the rear wheel 7.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle generator hub comprising:
    a hub shaft configured and arranged to be non-rotatably mounted to a bicycle frame;
    a hub shell rotatably mounted around the hub shaft;
    first and second bearings disposed between the hub shell and the hub shaft;
    a generator mechanism having a coil directly mounted to the hub shaft and a plurality of magnets disposed opposite the coil on an inner circumferential surface of the hub shell to generate electric power from rotation of the hub shell relative to the hub shaft, the coil including a plurality of claw-type secured yokes disposed in an alternating fashion, a coil unit disposed between the secured yokes and a core yoke disposed inside the coil unit; and
    first and second magnetic flux recirculation members disposed on the hub shell to return a leaked magnetic flux to the coil, each of the first and second magnetic flux recirculation members axially extending along the hub shaft and having an inner end adjacent the secured yokes and radially spaced from the hub shaft at least as far as an inner edge of the coil unit.

2. The bicycle generator hub according to claim 1, wherein the hub shaft is formed of a magnetic metal.

3. The bicycle generator hub according to claim 1, wherein
    the hub shell includes a cylindrical member with the magnets of the generator mechanism mounted thereto.

4. The bicycle generator hub according to claim 3, wherein
    the hub shell has first and second cap members that are disposed between the cylindrical member and the first and second bearings, respectively.

5. The bicycle generator hub according to claim 4, wherein
    the first and second magnetic flux recirculation members are disposed on the first and second cap members, respectively, and extend toward the coil.

6. The bicycle generator hub according to claim 4, wherein
    the first and second magnetic flux recirculation members are integrally formed with the first and second cap members, respectively.

7. The bicycle generator hub according to claim 4, wherein
    the cylindrical member is made of an aluminum alloy, and the first and second cap members are made of an iron-based metal.

8. The bicycle generator hub according to claim 4, wherein
the cylindrical member and the first and second cap members are made of an iron-based metal.

9. The bicycle generator hub according to claim 4, wherein
each of the first and second cap members of the hub shell is bent towards the coil to form the first and second magnetic flux recirculation members, respectively.

10. The bicycle generator hub according to claim 1, wherein
the first and second magnetic flux recirculation members are made of an iron-based metal.

11. The bicycle generator hub according to claim 10, wherein the first and second magnetic flux recirculation members have rod-shaped members.

12. The bicycle generator hub according to claim 1, wherein
the first and second magnetic flux recirculation members are annular and disposed around the hub shaft.

13. The bicycle generator hub according to claim 1, wherein
the first and second magnetic flux recirculation members have rod-shaped members.

14. A bicycle generator hub comprising:
a hub shaft configured and arranged to be non-rotatably mounted to a bicycle frame;
a hub shell rotatably mounted around the hub shaft, the hub shell including a cylindrical member and first and second cap members;
first and second bearings disposed between the hub shell and the hub shaft, the first and second cap members being disposed between the cylindrical member and the first and second bearings, respectively;
a generator mechanism having a coil directly mounted to the hub shaft and a plurality of magnets disposed opposite the coil on an inner circumferential surface of the cylindrical member to generate electric power from rotation of the hub shell relative to the hub shaft, the coil including a plurality of claw-type secured yokes disposed in an alternating fashion; and
first and second magnetic flux recirculation members disposed on the hub shaft and extending from the coil toward the first and second cap members, respectively.

15. A bicycle generator hub comprising:
a hub shaft configured and arranged to be non-rotatably mounted to a bicycle frame;
a hub shell rotatably mounted around the hub shaft, the hub shell including a cylindrical member;
first and second bearings disposed between the hub shell and the hub shaft;
a generator mechanism having a coil mounted to the hub shaft and a plurality of magnets disposed opposite the coil on an inner circumferential surface of the cylindrical member to generate electric power from rotation of the hub shell relative to the hub shaft, the coil including a plurality of claw-type secured yokes disposed in an alternating fashion; and
first and second magnetic flux recirculation members directly mounted to the hub shaft and extending toward the coil.

16. A bicycle generator hub comprising:
a hub shaft configured and arranged to be non-rotatably mounted to a bicycle frame;
a hub shell rotatably mounted around the hub shaft;
first and second bearings disposed between the hub shell and the hub shaft;
a generator mechanism having a coil directly mounted to the hub shaft and a plurality of magnets disposed opposite the coil on an inner circumferential surface of the hub shell to generate electric power from rotation of the hub shell relative to the hub shaft, the coil including a plurality of claw-type secured yokes disposed in an alternating fashion; and
first and second magnetic flux recirculation members, each having a first end portion that contacts the coil and a second end portion that is disposed proximate to one of the hub shell and the hub shaft.

17. The bicycle generator hub according to claim 16, wherein
the first and second magnetic flux recirculation members are made of an iron-based metal.

18. The bicycle generator hub according to claim 16, wherein
the first and second magnetic flux recirculation members are annular and disposed around the hub shaft.

19. The bicycle generator hub according to claim 16, wherein the first and second magnetic flux recirculation members have rod-shaped members.

* * * * *